Patented Aug. 5, 1952

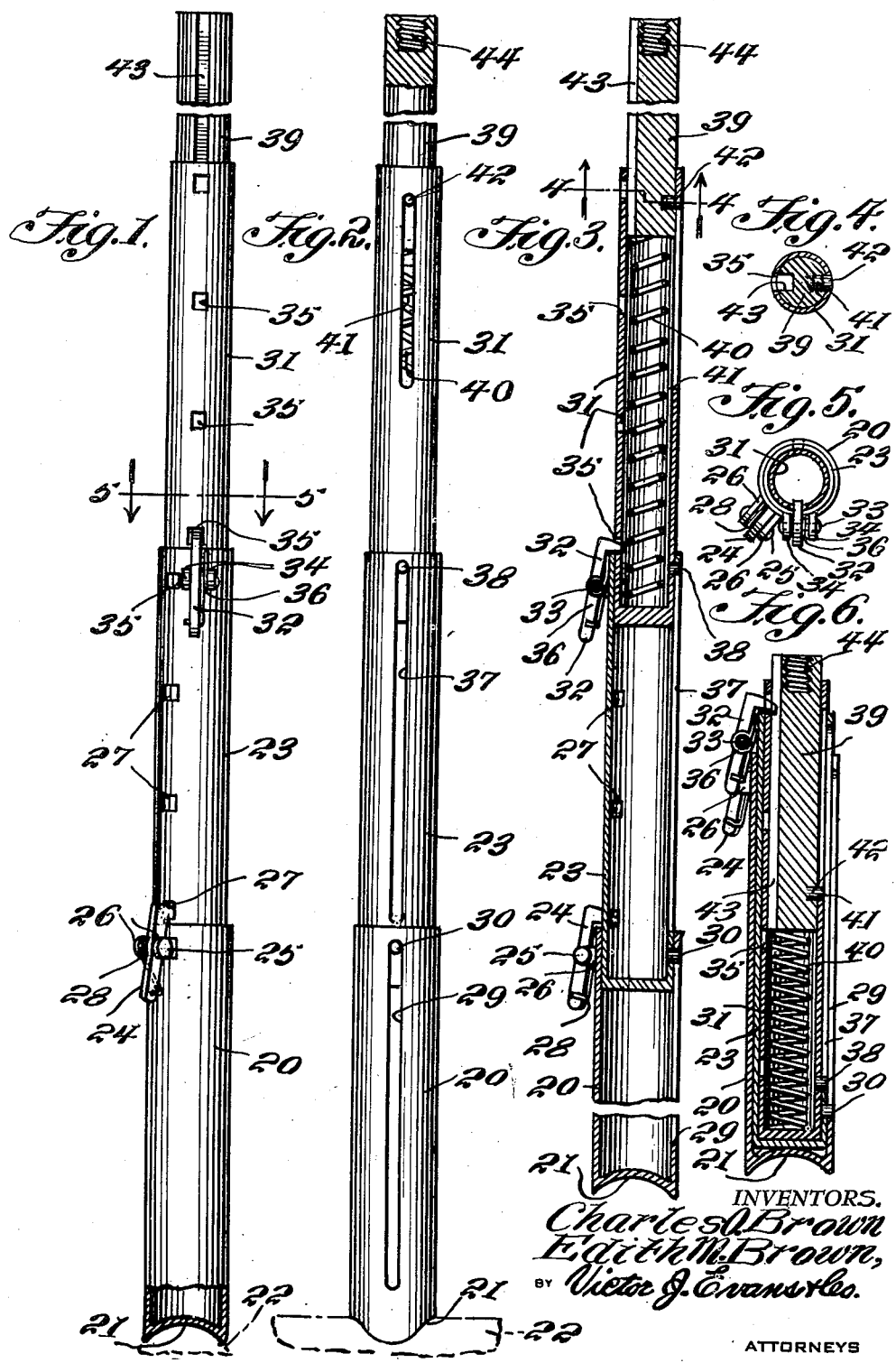

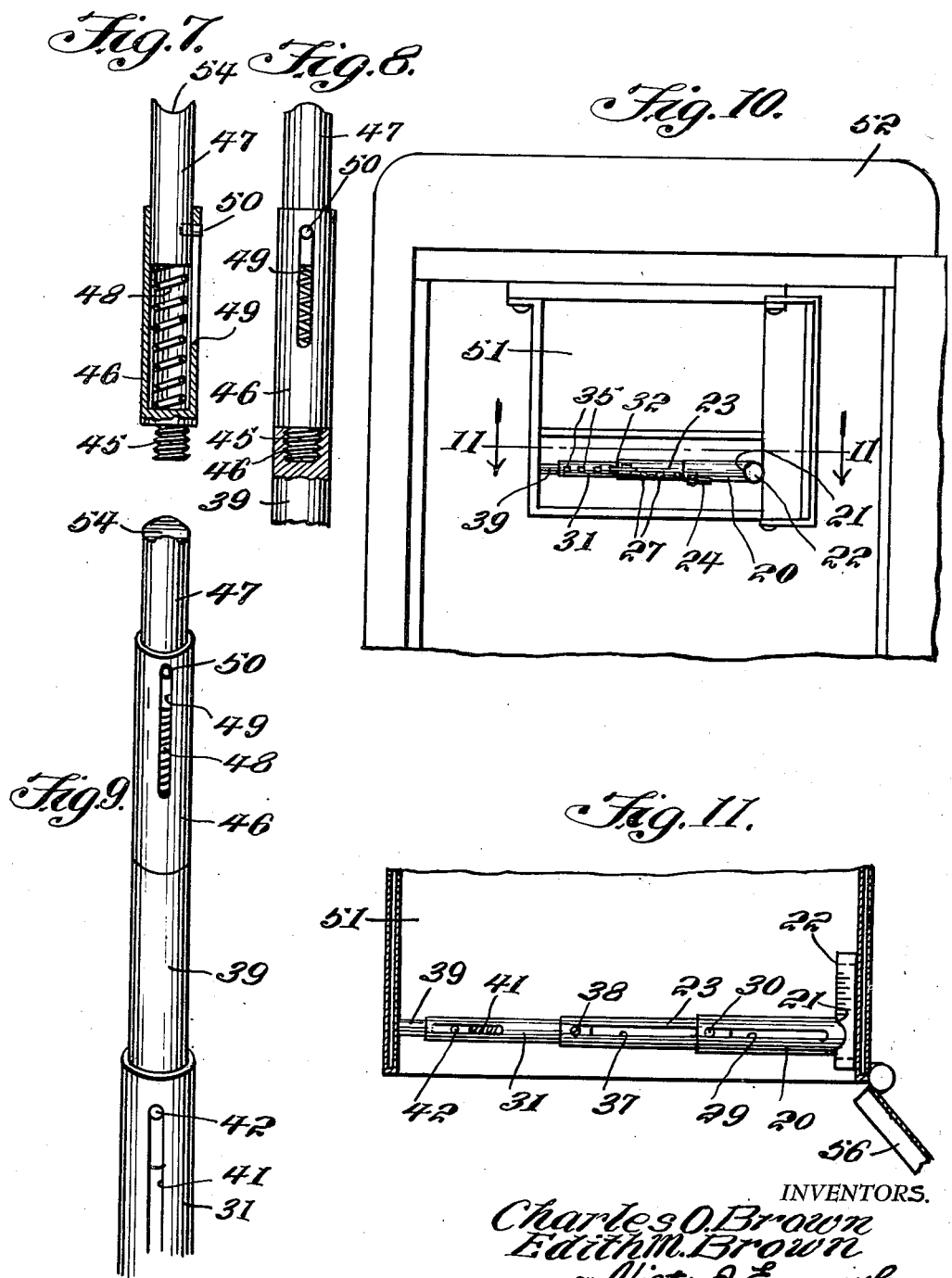

2,605,987

UNITED STATES PATENT OFFICE 2,605,987

THERMOMETER HOLDER

Charles Otis Brown and Edith Marie Brown, Fresno, Calif.

Application November 16, 1948, Serial No. 60,348

2 Claims. (Cl. 248—161)

This invention relates to a thermometer, and more particularly to a holder for supporting a thermometer against a heat-exchange surface, such as that employed in a refrigerator evaporator.

The object of the invention is to provide a holder for supporting a thermometer against a heat-exchange surface, such as a refrigerator evaporator, in order to adapt the thermometer for quick and accurate temperature measurements.

Another object of the invention is to provide a refrigerator thermometer holder adjustable as to length which comprises a plurality of sections telescopically adjustable whereby the holder can be adjusted to firmly engage supporting abutments to retain the holder in position.

A further object of the invention is to provide a refrigerator thermometer holder which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a side elevational view of the thermometer holder in extended position, according to the present invention;

Figure 2 is a front elevational view of the thermometer holder in extended position with parts broken away and in section;

Figure 3 is a vertical sectional view of the thermometer holder in extended position;

Figure 4 is a sectional view taken on the line 4—4 of Figure 3;

Figure 5 is a sectional view taken on the line 5—5 of Figure 1;

Figure 6 is a vertical sectional view showing the thermometer holder in collapsed position;

Figure 7 is a vertical sectional view of a member for attachment to the thermometer holder for extending the length of the holder;

Figure 8 is a fragmentary front elevational view illustrating the member of Figure 7 attached to the holder;

Figure 9 is a fragmentary perspective view of the member of Figure 7 attached to the thermometer holder;

Figure 10 is a fragmentary front elevational view of a refrigerator illustrating the holder supporting a thermometer in the evaporator thereof;

Figure 11 is an enlarged sectional view taken on the line 11—11 of Figure 10.

Referring in detail to Figures 1 to 6 of the drawings, the thermometer holder is preferably fabricated of brass tubing and comprises a first tubular section or barrel 20 provided with an arcuate end wall 21 curved to define a socket for snugly receiving a portion of a cylindrical thermometer 22. A second tubular section 23 has a diameter slightly less than that of the section 20 so that the section 23 can telescope for a portion of its length within the outer or first section 20.

For releasably locking the section 23 in its relative adjusted position, a manually-operable, L-shaped clamping lever or catch 24 is pivotally connected to the outer section 20 by means of a pin 25 supported on a pair of lugs 26. The top of the clamping lever 24 is mounted for movement into and out of registry with one of the spaced openings 27 in the second section 23, and for manually biasing the clamping lever 24 into engagement with one of the openings 27, a spring 28 is circumposed on the pin 25 and connected to the lever 24.

For guiding the second section 23 in the outer section 20 and for preventing the section 23 from turning or rotating relative to the outer section 20, a longitudinally-extending slot 29 is formed in the first section 20 for receiving a stud 30 which projects from the exterior surface of the second section 23.

A third tubular section 31 has a diameter slightly less than the diameter of the second section 23 so that it can telescope for a portion of its length within the second section 23.

For releasably locking the third section 31 in relative adjusted position, a manually-operable, L-shaped clamping lever or catch 32 is pivotally connected to the second section 23 by means of a pin 33 supported on a pair of lugs 34. The tip of the clamping lever 32 is mounted for movement into and out of registry with one of the spaced openings 35 in the third section 31 and for manually biasing the clamping lever 32 into engagement with one of the openings 35, a spring 36 is circumposed on the pin 33 and connected to the lever 32.

For guiding the third section 31 in the second section 23 and for preventing the section 31 from turning or rotating relative to the second section 23, a longitudinally-extending slot 37 is formed in the second section 23 for receiving a stud 38 which projects from the exterior surface of the third section 31.

A cylindrical shank or bar 39 has a diameter slightly less than the diameter of the third section 31 so that it can telescope for a portion of its length within the third section 31. A coil spring 40 is positioned within the third section 31 and abuts the shank 39 for manually urging or biasing the shank 39 out of the third section 31.

For guiding the shank 39 and for preventing the shank from turning or rotating relative to the third section 31, a longitudinally-extending slot 41 is formed in the third section 31 for receiving a stud 42 which projects from the exterior surface of the shank 39. The shank 39 is also provided with a longitudinally-extending groove 43 for receiving therein the tip of the clamping lever 32 when the thermometer holder is in its collapsed position, Figure 6.

In certain instances it may be necessary to extend the length of the thermometer holder beyond that permitted by the three telescoping sections 20, 23 and 31, and the shank 39. Therefore, the outer end of the shank 39 is provided with an internally-threaded bore 44 for receiving an externally-threaded barrel 46, Figures 7, 8 and 9. The barrel 46 is of the same diameter as the shank 49 and telescopically receives a rod 47 therein, the rod 47 having an arcuate socket 54 for at times receiving the thermometer 22 therein. A coil spring 48 is positioned within the barrel 46 for normally biasing the rod 47 out of the open end of the barrel 46. For guiding the rod 47 in the barrel 46 and for preventing rotation of the rod 47 relative to the barrel 46, a longitudinally-extending slot 49 is formed in the barrel 46 for slidably receiving a stud 50 that projects from the rod 47.

The above-described holder is particularly useful for holding a thermometer 22 in any position or spot in a freezer or evaporator 51 of a refrigerator 52 to determine true temperatures as in checking for certain refrigeration failures. In Figures 10 and 11, with the evaporator door 55 open, the holder is shown positioned below a shaft 53 in the evaporator with the sections thereof in extended position, wherein the shank 39 abuts one side of the evaporator 51, while the thermometer abuts the opposite side of the refrigerator and is received within the socket 21 of the first section 20. The thermometer holder can be used with evaporators of various size because of the telescopic arrangement of the sections, together with the provision of the clamping levers for locking the sections in their adjusted positions. In the event that the thermometer 22 is to be held on the bottom of the evaporator 52, the smaller barrel and rod assembly of Figures 7, 8 and 9 may be used alone, whereby the stem 45 of the barrel 46 abuts the bottom of the shelf 53, and thermometer 22 is positioned at the bottom of the evaporator and snugly received by the socket 54 in the rod 47. If the freezer or evaporator is exceptionally wide, the barrel and rod assembly of Figures 7 and 8 can be attached to the holder of Figures 1 to 6, as shown in Figure 9.

As many embodiments may be made of this inventive concept, and as many modifications may be made in the embodiment hereinbefore shown and described, it is to be understood that all matter herein is to be interpreted merely as illustrative and not in a limiting sense.

We claim:

1. In a thermometer holder, a first tubular section provided with an arcuate end wall to define a socket in one end for receiving a portion of said thermometer, a second tubular section having a diameter slightly less than said first section telescopically arranged within said first section, there being a longitudinally extending slot in said first section, a stud projecting from said second section and arranged in registry with said slot for preventing rotation of said second section within said first section, there being a plurality of spaced openings in said second section, a manually operable clamping lever having an L shape pivotally mounted for movement into and out of said openings for locking said section in its adjusted positions, a pair of lugs projecting from said first section, a pin pivotally connecting said lever to said pair of lugs, resilient means embodying a spring circumposed on said pin for normally biasing said clamping lever into engagement with one of said openings, a third tubular section having less diameter than said second section telescopically arranged within said second section, manually operable means embodying a lever for releasably locking said third section in its adjusted positions, means for preventing relative rotation of said third section within said second section, a shank telescopically arranged within said third section, means for preventing rotation of said shank relative to said third section, and a coil spring positioned in said third section for normally urging said shank out of said third section.

2. In a thermometer holder, a first tubular section provided with an arcuate end wall to define a socket in one end for receiving a portion of said thermometer, a second tubular section having a diameter slightly less than said first section telescopically arranged within said first section, there being a longitudinally extending slot in said first section, a stud projecting from said second section and arranged in registry with said slot for preventing rotation of said second section within said first section, there being a plurality of spaced openings in said second section, a manually operable clamping lever having an L shape pivotally mounted for movement into and out of said openings for locking said section in its adjusted positions, a pair of lugs projecting from said first section, a pin pivotally connecting said lever to said pair of lugs, resilient means embodying a spring circumposed on said pin for normally biasing said clamping lever into engagement with one of said openings, a third tubular section having less diameter than said second section telescopically arranged within said second section, manually operable means embodying a lever for releasably locking said third section in its adjusted positions, means for preventing relative rotation of said third section within said second section, a shank telescopically arranged within said third section, means for preventing rotation of said shank relative to said third section, and a coil spring positioned in said third section for normally urging said shank out of said third section, there being an interiorly threaded bore in the outer end of said shank, an exteriorly threaded barrel arranged in engagement with said bore and having the same diameter as said shank, a rod telescopically arranged in said barrel and provided with an arcuate socket for receiving a thermometer therein.

CHARLES OTIS BROWN.
EDITH MARIE BROWN.

REFERENCES CITED

The following references are of record in the file of this patent:

UNITED STATES PATENTS

| Number | Name | Date |
| --- | --- | --- |
| 916,413 | Biedermann | Mar. 20, 1909 |
| 1,130,497 | Dunham | Mar. 2, 1915 |
| 1,887,233 | Condos | Nov. 8, 1932 |